March 29, 1932.  H. H. HACKSTEDDE  1,851,388
APPARATUS FOR MIXING, DEVELOPING, AND CONDITIONING DOUGH
Filed Jan. 4, 1930  7 Sheets-Sheet 1
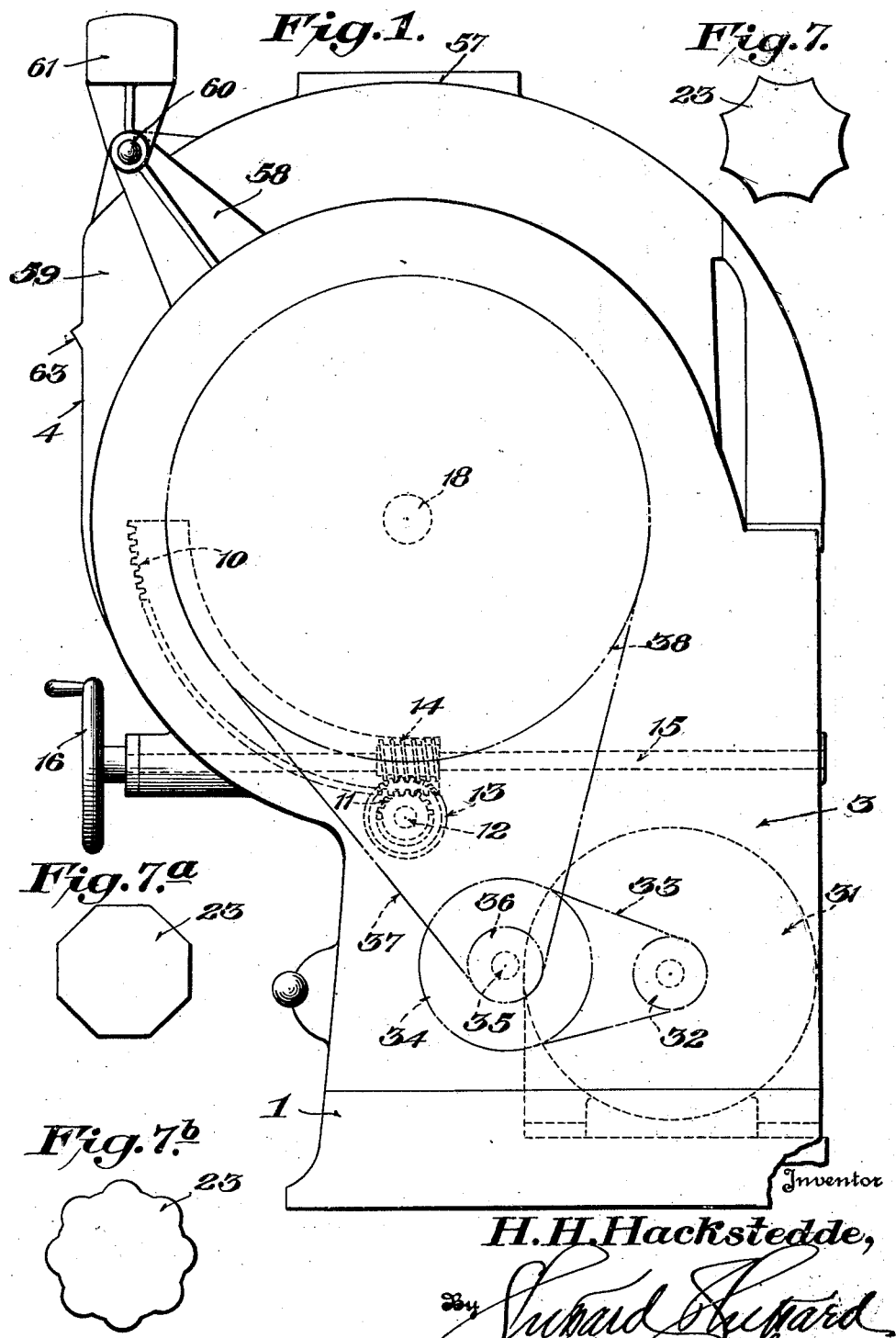
Inventor
H. H. Hackstedde,

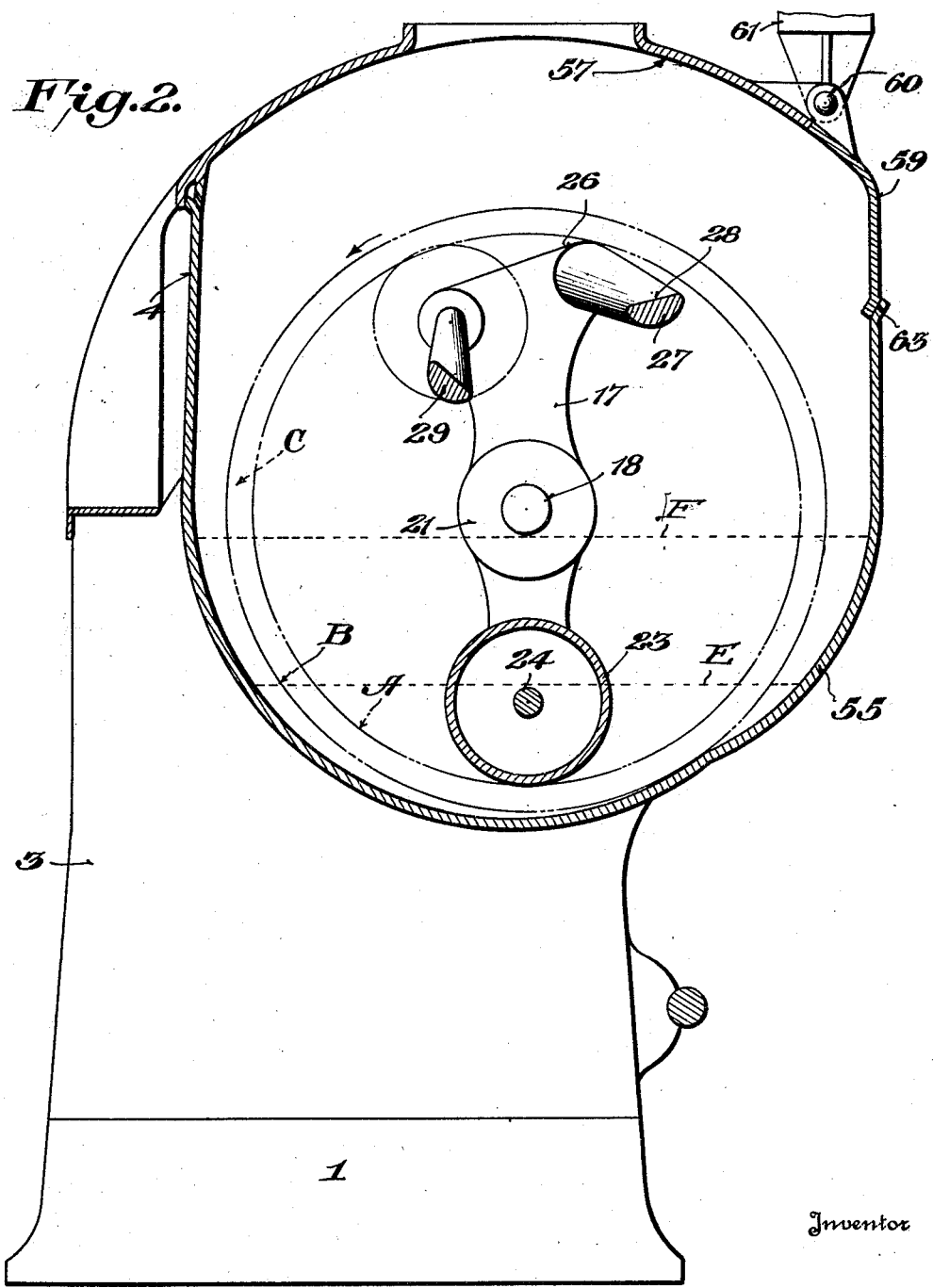

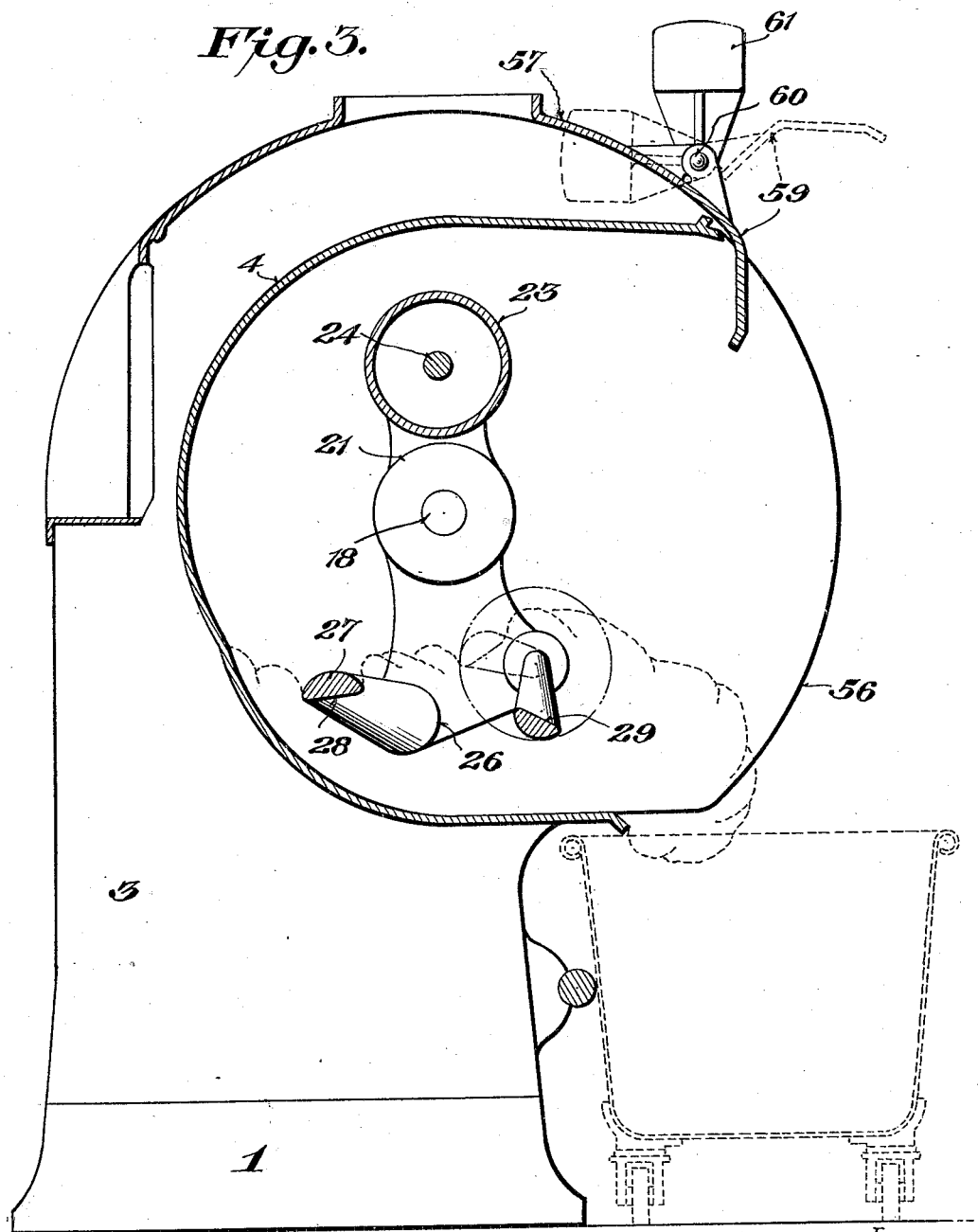

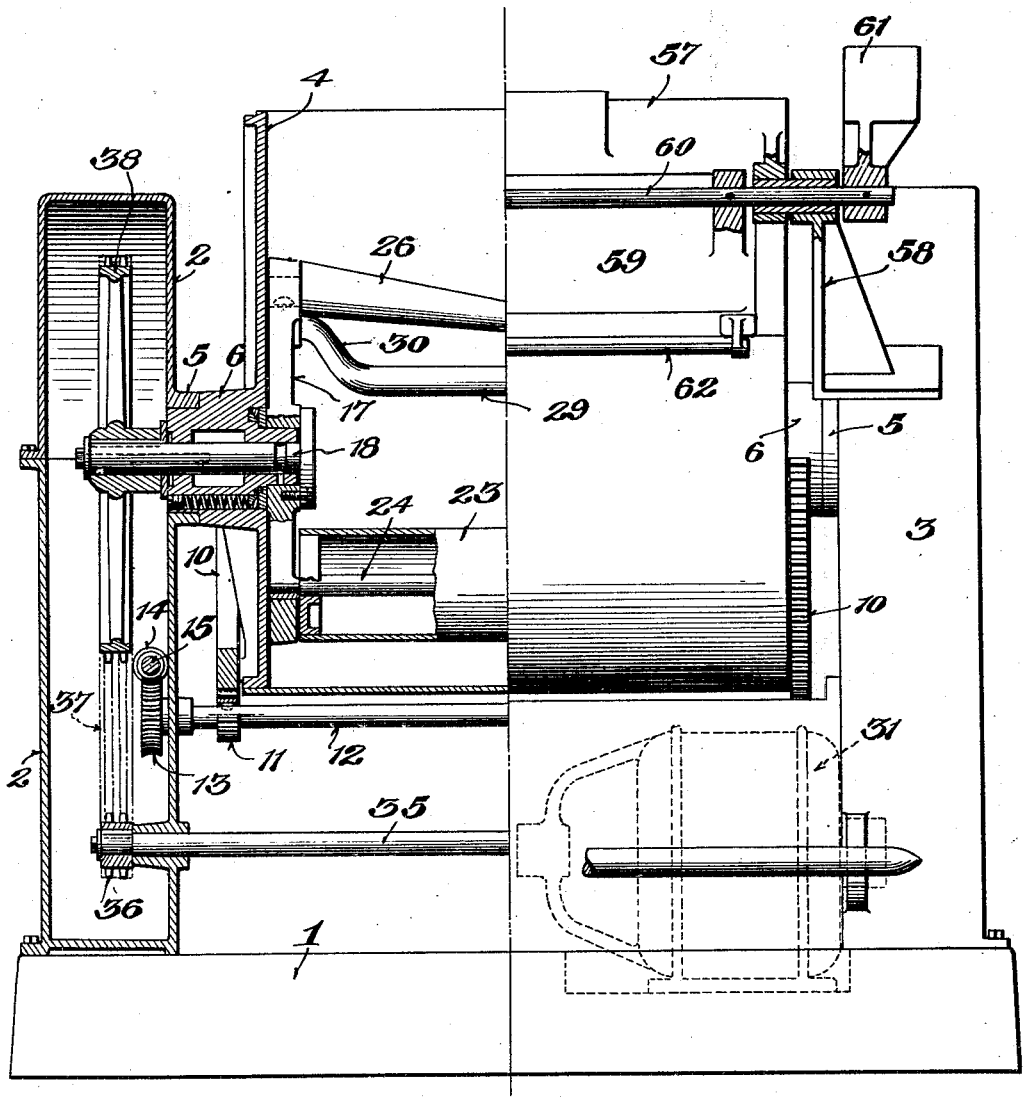

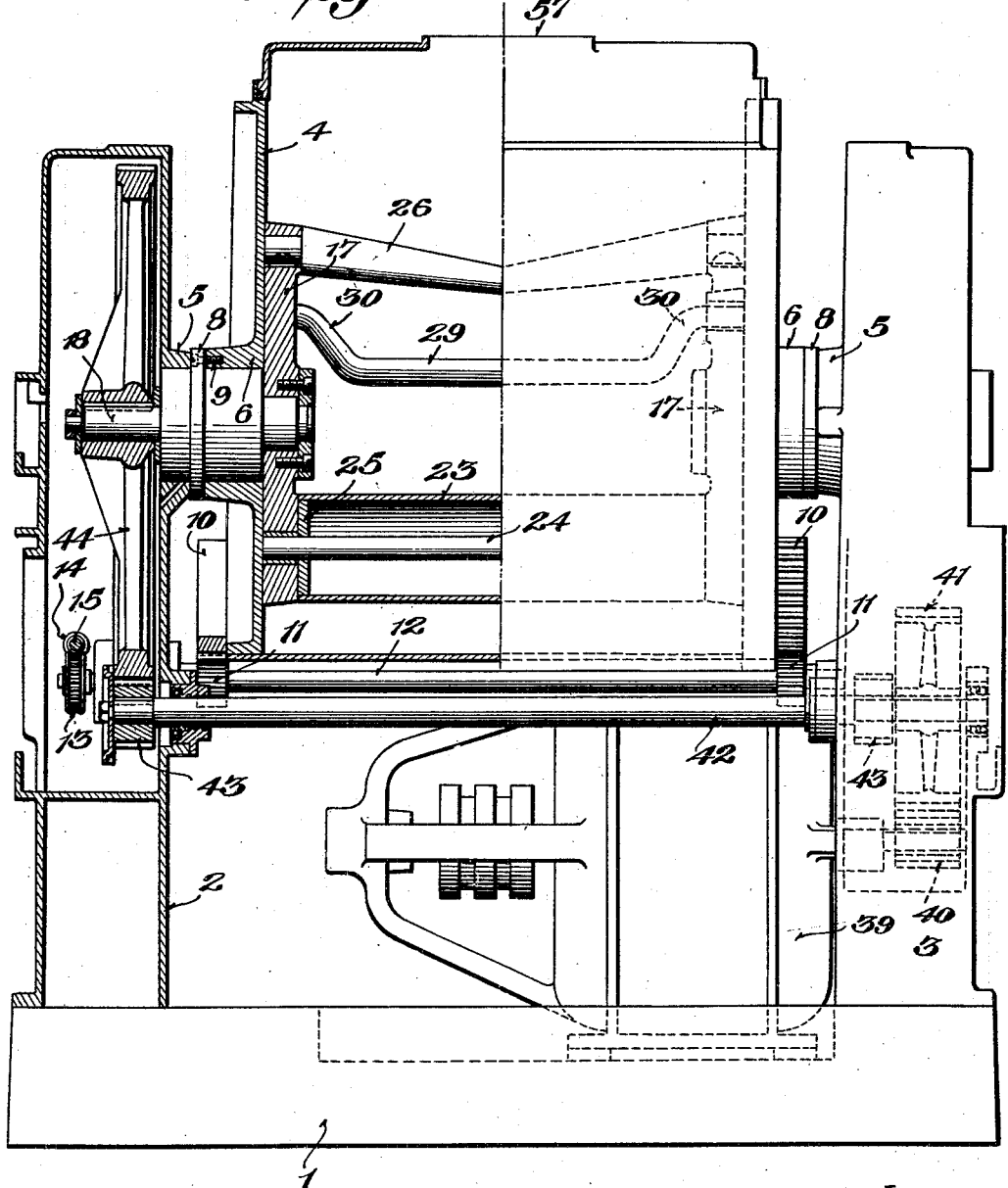

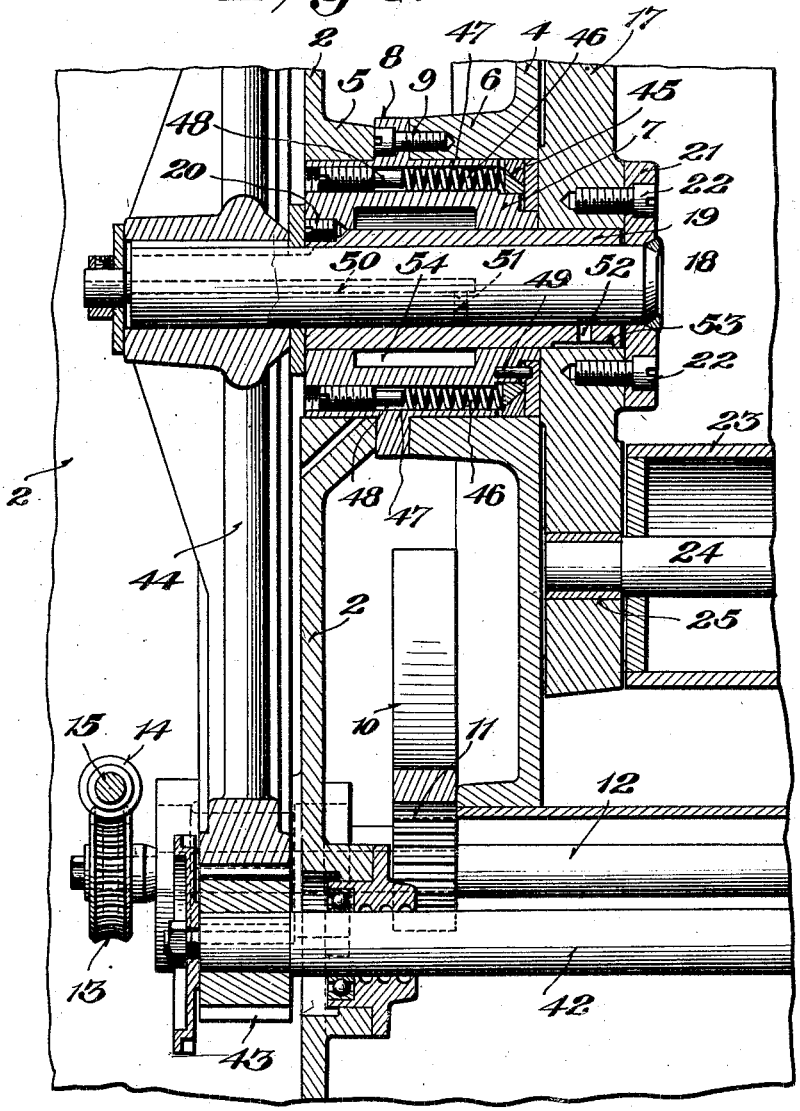

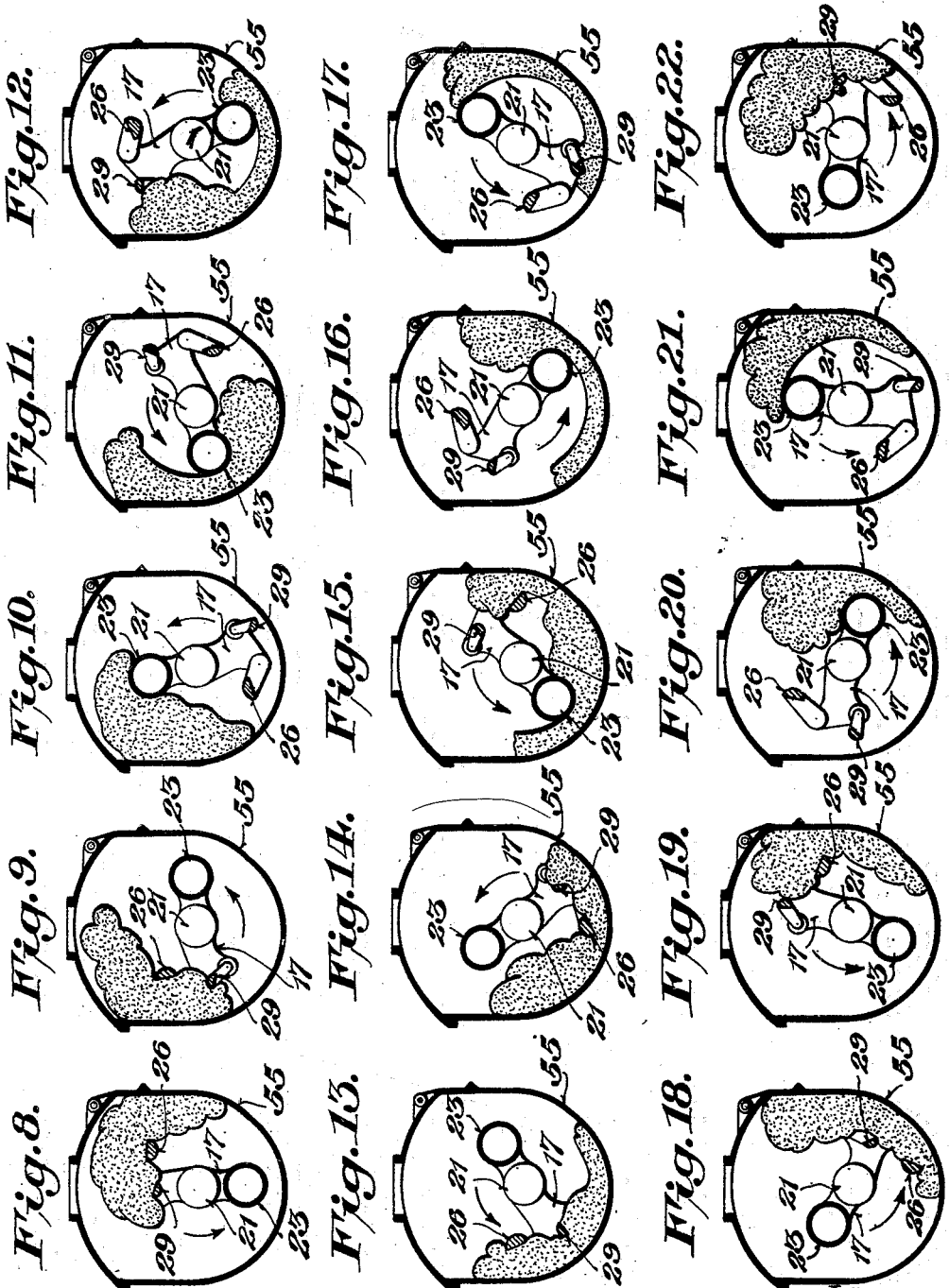

tain the dough in a proper position for effective working thereof by the element 23.

Figure 1:
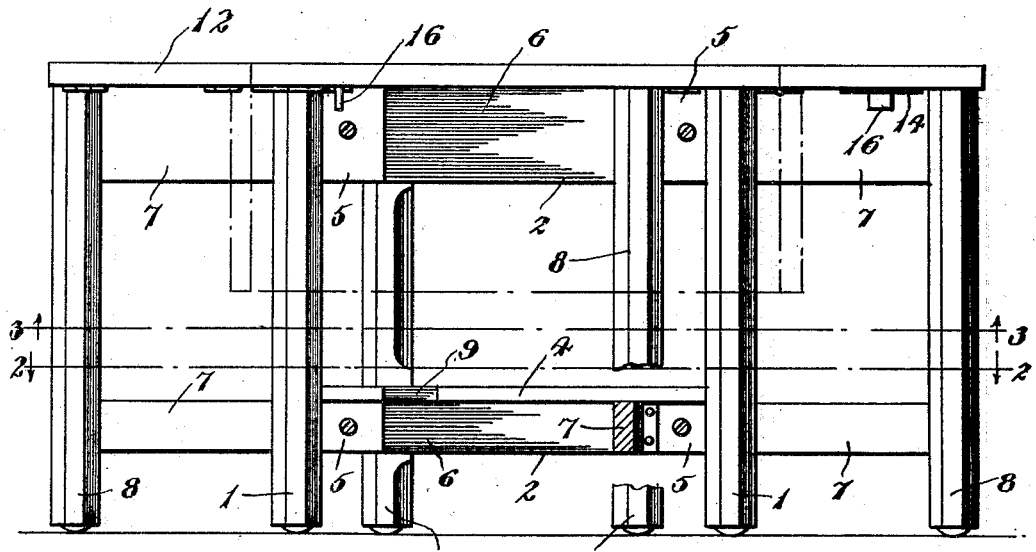

The rotary motion is imparted to the composite mixing device from an electric motor 31, shown in Figures 1 and 4 of the drawings. This motor is provided with a drive pulley or sprocket 32, shown in Figure 1, from which a belt or sprocket chain 33 leads to sprocket 34 on a shaft 35 journalled at opposite ends in the standards 2 and 3. On each end of the shaft 35, there is provided a pulley or sprocket 36 from which a belt or sprocket chain 37 leads to a large pulley or sprocket wheel 38 carried by the outer end of the shaft 18, whereby a relatively slow but powerful rotary motion will be imparted to the shaft 18. It will of course be understood that similar pulleys 36 and 38 and a drive belt or chain 37 are provided within the hollow standard 3, whereby both cross-heads 17 are simultaneously and independently rotated with a slow but powerful motion.

A slightly different form of drive is shown in Figures 5 and 6, and includes an electric motor 39 provided with a pinion 40 in mesh with a gear 41 carried by a shaft 42 journalled at opposite ends in the inner walls of the standards 2 and 3. The shaft 42 carries, within each hollow standard, a pinion 43 in mesh with a large gear 44 carried by the adjacent shaft 18, whereby each cross-head 17 is independently driven with a slow but powerful motion. It will here be noted that the worm wheel 13, the worm 14 and the shaft 15, in the arrangement shown in Figures 5 and 6, are located at the outer side of the gear 44, whereas in the arrangement shown in Figures 1 to 4 inclusive, these same members are located between the inner wall of the standard 2 and the drive belt 37.

For the purpose of preventing leakage from the interior of the bowl 4 outwardly thru each bearing and also leakage of the lubricant inwardly into the interior of the bowl, there is provided means, best shown in Figure 6, to accomplish this result, which includes washers 45 embracing the inner end of the bearing sleeve 7 with one of the washers engaging the adjacent face of the cross-head 17. Inward pressure is exerted against these washers by springs 46 mounted in bores or openings 47 extending longitudinal thru the sleeve 7. Each spring is held in place by a screw threaded plug 48 fitted into the screw threaded outer end of the bore, whereby the tension of each spring may be adjusted so as to apply the necessary pressure to the group of washers 45 to prevent the escape or leakage of liquid from the bowl through the bearing. If desired, a pin 49 may be employed to prevent rotation of the washer member which bears against cross-head 17.

Lubrication may be supplied to the bearing bearing through a longitudinal passage 50 formed in the shaft 18 and leading inwardly from the outer end thereof to a cross passage 51 opening thru the exterior of the shaft. A suitable oil port 52 is provided through the inner end of the sleeve 19 and leading to a recess 53 in the exterior of the sleeve and within the shaft opening in the cross-head 17. An oil chamber 54 is provided in the inner walls of the sleeve 7.

A slightly modified form of bearing for the bowl 4 is illustrated in Figure 4 of the drawings, wherein it will be seen that instead of having a separate sleeve 7, as in Figure 6, the sleeve and the hub 6 are integral.

Figure 2:
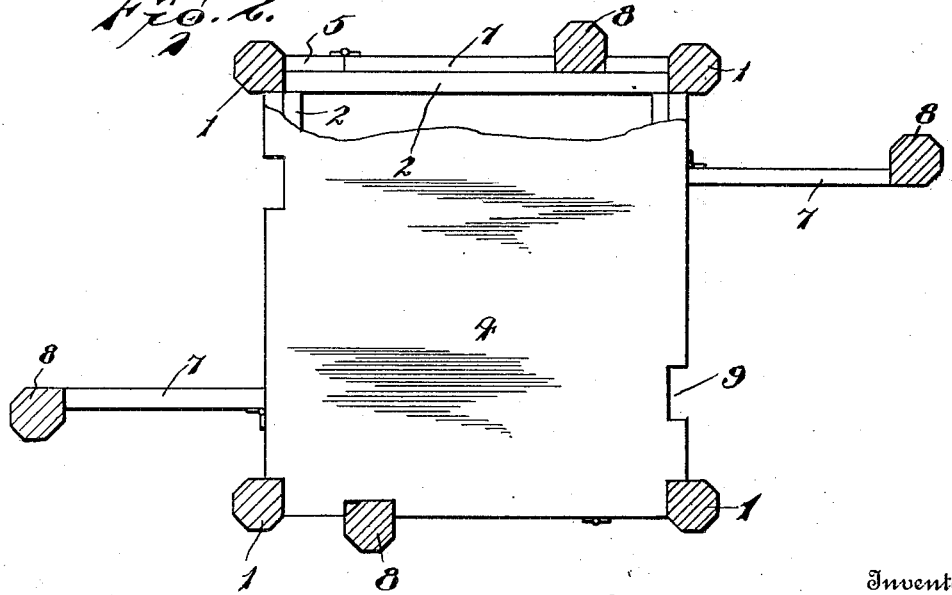

The shape or configuration of the bowl in a plane at right angles to the axis of rotation of the composite mixing device is an important feature of this invention, and is well shown in Figures 2 and 3 of the drawings. The bowl is U-shaped in vertical cross-section, not truly cylindrical, as will be understood by reference to Figure 2, wherein the dotted circle A indicates the path of the outside of the member 23 while the dotted circle B is also scribed from the axis of rotation of the dough mixing device and is intended for comparison with the shape of the bowl. It will be noted that the shaft 18 or axis of rotation of the mixing device, is below the horizontal center of the bowl, so that the paths of the elements 23, 26 and 29 come closer to the bowl at a point near the bottom thereof, as at D, than to the top and the front and back walls thereof, so that there is a crescent shaped space designated C between the back wall of the bowl and the paths of the members 23, 26 and 29 for a purpose as will hereinafter appear. The lower front wall of the bowl is bowed outwardly, as at 55, to provide an enlarged collecting space at the lower front portion of the bowl to accommodate the dough and enable the collection thereof in a manner and for the purpose which will be hereinafter described.

For the purpose of introducing the water, flour and other ingredients, the top portion of the bowl is open and normally registers with a stationary top or hopper 56 supported at each end by an arm 58 extending from the adjacent frame standard. Any suitable means, not shown, may be employed for closing the opening 56 in the top or hopper 57.

The opening in the top of the bowl extends downwardly a suitable distance across the front of the bowl and is normally closed by a lid or door 59 hinged as at 60 upon the front of the hopper 57. A suitable handle bar 62 is provided upon the front lower portion of the lid or door 59 for convenience in lifting the same. The counterweighted arm 61 will support the lid or door 59 in its open or elevated position, as shown in Figure 3 of the drawings, when the bowl has been tilted from its operative upright position as shown in Figure 2, to its dumping position as shown in Figure 3. The lower edge of the lid or door 59 meets the upper edge of the opening 56 in the bowl in a beveled joint so as to insure a tight fit between these parts and to hold the door closed, as it is important to prevent the escape of ingredients in the initial stages of the operation.

An important mechanical feature of the present apparatus resides in the employment of the fixed long bearing sleeve 19 having its inner end projecting into the interior of the bowl with the cross-head 17 supported by and mounted to rotate upon the inwardly projecting end of the sleeve, whereby the cross-head has a relatively long bearing and the entire weight of the combined mixing, developing and conditioning device is supported by the inner end portions of the two sleeves 19 at opposite ends of the bowl. It will therefore be understood that the weight of the cross-heads 17 and their connecting parts does not come upon the stub shafts 18, but upon the inner projecting ends of the sleeves 19 and consequently there is no tendency of the shafts to tilt longitudinally within the sleeves and become worn by the cutting action of the end edges of the sleeves. This improved construction obviates the necessity of frequent replacements of the stub shafts 18.

In using the apparatus of the present invention, it will of course be understood that water, flour, yeast and any other desired ingredients are introduced into the bowl thru the opening in the top thereof, and then the electric motor is started so as to rotate the mixing device. It is, of course, desirable to form the flour, water and other ingredients into a plastic mass as quickly as possible, and at the same time to agitate the materials so as to bring about a uniform distribution of all the ingredients. In this connection, it will be explained, by reference to Figure 2 of the drawings, wherein the dotted line E indicates the level of the liquid and F indicates the top of the dry ingredients, that the roller 23 presents a large surface to the dry ingredients and forces the latter into the liquid on the downward movement of the roller at the back of the bowl, which results in a very quick and uniform incorporation of the dry ingredients with the liquid.

Following the action of the roller 23 comes the action of the cross-bar 29 which presents its flat face to the top surface of the dry ingredients, as indicated in dotted lines in Figure 2 of the drawings, due to the crank mountings of the ends of the bar. Inasmuch as the bar necessarily trails the pivotal axis of its crank terminals, such crank terminals are disposed at an obtuse angle to the main portion of the bar and operate to force the ingredients inwardly in opposite directions from the ends of the bowl towards the center thereof.

Following the action of the bar 29 comes the action of the rigid cross-bar 26, which passes downwardly thru the dry ingredients and the water and causes an effective agitation thereof, in addition to which, and by reason of the lengthwise inclination of the opposite half sections of the bar, the ingredients are forced or crowded inwardly in opposite directions from the opposite ends of the bowl. It will here be explained that by reason of the comparatively large surface of the roller 23 which is presented to the dry ingredients, there is a forcing of such dry ingredients into the liquid as distinguished from prior practice wherein agitation devices presenting relatively narrow surfaces merely cut thru the materials and stir them as in stirring with a spoon. The agitator bar 26 has an action similar to that of the roller 23 because of the comparatively large surface 28 thereof which is presented to and works upon the dry ingredients as the bar passes downwardly at the back of the bowl. In the initial mixing stage, the roller 23 does not rotate upon its axis for the reason that the roller passes downwardly thru the dry ingredients and the liquid which present substantially equal pressures at opposite sides of the roller such that there is no tendency of the roller to rotate on its axis. This is important in that there would be a scattering of the ingredients around the bowl if there was a positive rotation of the roller on its axis during the initial stages of the mixing of the ingredients.

The mixing operations of the roller 23 and the bars 26 and 29, which of course include the compressing of the dry ingredients into the liquid, are so effective that the ingredients are formed into a plastic mass in about 15 seconds. Hitherto, so far as I am aware, the mixing of dry ingredients and liquid into a plastic mass has usually required from one to two minutes.

The action of the apparatus on the plastic mass formed as the result of the mixing operation will be readily understood by reference to Figures 8 to 22 inclusive, which show the action on the dough mass at approximately one-fifth second intervals. While the cross-bars 26 and 29 have a working or kneading effect upon the mass of dough, they also move the dough around the bowl, while the roller 23 rolls over the dough while the latter is stationary and compresses it against the walls of the bowl in the manner indicated in the drawings. The mixing and kneading device makes a complete revolution or cycle during each second of operation of the apparatus, as will be readily seen by an inspection of Figures 8 to 22 inclusive, but it takes about three cycles to move the batch of dough entirely around the bowl so that the kneading roller 23 operates a plurality of times upon the dough while the latter is making one complete cycle of movement around the bowl. It will be noted that there is no ribboning and tearing of the dough mass, but on the contrary there is a working or kneading or compression of the dough against the walls of the bowl.

During a single cycle of the working and mixing device, such for instance as has been shown in Figures 8 to 12 inclusive, the agitator bars 26 and 29 operate to carry the batch of dough from the upper front portion of the bowl across the top thereof to the back of the bowl where the dough is pressed against the back of the bowl by the members 26 and 29, after which the roller 23 comes into working engagement with the mass of dough and compresses it against the back wall of the bowl and rolls over the surface of the dough as indicated in Figures 10, 11 and 12. About as soon as the roller 23 clears the lower end of the batch of dough, see Figure 12, the bars 26 and 29 again come into engagement with the dough, and effect a punching and kneading action upon the plastic mass as illustrated in Figures 13 and 14. Also the bars 26 and 29 effect a feeding action upon the plastic mass to move the same in an orbit around the bowl. It will here be explained that the bars 26 and 29 effect an intermittent feeding or moving of the plastic mass in an orbit around the interior of the bowl, and that the mass is stationary, or substantially so, in the intervals between the feeding movements thereof. The roller 23 acts upon the plastic mass with a rolling wiping action only when the plastic mass is stationary to compress it against the walls of the bowl without exerting any surface friction which would tend to tear or rupture the surface of the dough.

A very important feature of the present invention is the folding over of the dough mass upon itself, as illustrated in Figures 9 and 10, and 13 and 14. In the condition shown in Figure 9 with the bars 26 and 29 adjacent the lower end of the dough, the upper portion of the dough is unsupported and therefore folds downwardly upon the lower portion of the dough, as in Figure 10, whereupon the roller 23 comes along and presses together the folded over portions of the dough thereby closely simulating hand manipulation of the dough in a simple and efficient manner, and accomplishing by mechanical means that which has heretofore been accomplished by hand manipulation. This lapping over or folding of the dough is also accomplished at another stage of the operation of the apparatus, as shown in Figure 14. Immediately succeeding the action of the bars 26 and 29, as shown in Figures 13 and 14, which action advances the dough along the bottom of the bowl from the back to the front thereof, the rolling compressing action of the roller 23 is exerted as in Figures 15, 16 and 17. Then the bars 26 and 29 again come into play, as in Figures 18 and 19, so as to move the dough upwardly along the front wall of the bowl, and then the roller 23 rolls over the dough and compresses it against the front wall of the bowl. During the advancing of the dough upwardly from the bottom of the bowl across the front wall thereof, a very important feature results in that if there are any separate portions of dough, they will be gathered together in the collecting space 55 and united with the main mass of dough, thereby to maintain the dough in a mass and insure the treatment thereof as a unit by the bars 26 and 29 and the roller 23 in the various stages of operation of the apparatus.

It will now be understood that the bars 26 and 29 intermittently advance the dough mass as a unit in an orbit around the bowl and at the same time knead and work the dough, while the roller 23 wipes across the surface of the dough with a rolling action, in the intervals between the advancing action of the bars 26 and 27 and while the dough mass is stationary, thereby effecting a compression of the dough against the walls of the bowl without producing any surface stretching or tearing of the dough.

From the position of Figure 8 to the position of Figure 9, the dough is merely carried across the upper portion of the bowl from the front to the back by the bars 26 and 29 without any intended or appreciable working of the dough against the top of the bowl. The dough is worked and compressed against the back, bottom and front walls only of the bowl, and is merely carried across the upper portion of the bowl without any intentional working thereof against the top of the bowl.

The mixing, developing and conditioning device of the present apparatus makes about three complete cycles while the dough mass as a unit is being moved only once around the bowl.

In the second stage of the operation of the apparatus, the peculiar working of the dough mass by the cross-bars 26 and 29 and the roller produces an important development of the gluten which results in a strengthening of the walls of the cell structure of the dough, which increased wall strength enables the cell walls to absorb and carry materially more moisture without breaking down under the weight of the moisture than with prior methods, thereby giving the baked bread the quality of maintaining its freshness for a much longer time than ordinary. The present manner of working the dough has a strengthening effect thereon similar to that produced in forging metal. It has been found in practice that by reason of the present method of hydration and development of the gluten, there is no danger of over-development by running the apparatus longer than is necessary for the desired hydration and development. As a matter of fact, the prolonged operation of the apparatus results merely in a further strengthening of the cell walls, and the production of whiteness in color and a more uniform grain or cell structure. With ordinary methods and apparatus, excessive working of the dough will result in ribboning, stretching and tearing of the dough and the breaking down of the cell walls, thereby liberating moisture and producing a noticeable softening of the dough and an exterior which is wet and sticky to the touch. With the present method, there is no ribboning of the dough; there is a high moisture content but without wetness or stickiness to the touch; and a materially increased cell-wall strength producing resiliency, fluffiness and life in the dough mass. Also, as the dough is maintained in a unitary and dry mass, it may be dumped cleanly as a unit from the bowl without leaving any dough portions clinging to the bowl walls and to the mixing and developing device. A further very important feature of the present invention resides in the dough gathering action of the bars 26 and 29 followed by the compression rolling action of the roller 23. As hereinbefore described the bar 29 necessarily trails its pivot terminals, consequently the obtusely disposed crank ends 30 will force or crowd the dough from the ends of the bowl inwardly towards the center thereof and thus prevent the dough from collecting in the end portions of the bowl where the cross-heads 17 rotate. Hence the cross-heads 17 rotate in spaces entirely free from dough so that there is no collecting of the dough upon the cross-heads. The oppositely inclined portions of the bar 26 also force the dough towards the center of the bowl and form it into a unitary mass having a substantially convex outer face or raised at its center, as illustrated in Figure 23, after which the roller 23 travels across the convex face or raised center of the mass with a rolling compressing action that flattens out the mass which is thereafter again gathered together by the action of the cross-bars. Thus there is an intermittent feeding and gathering together of the dough into a heaped up convexed mass by the cross-bars, followed immediately by the rolling compressive action of the roller in each stationary interval of the dough mass between successive feeding or advancing movements thereof.

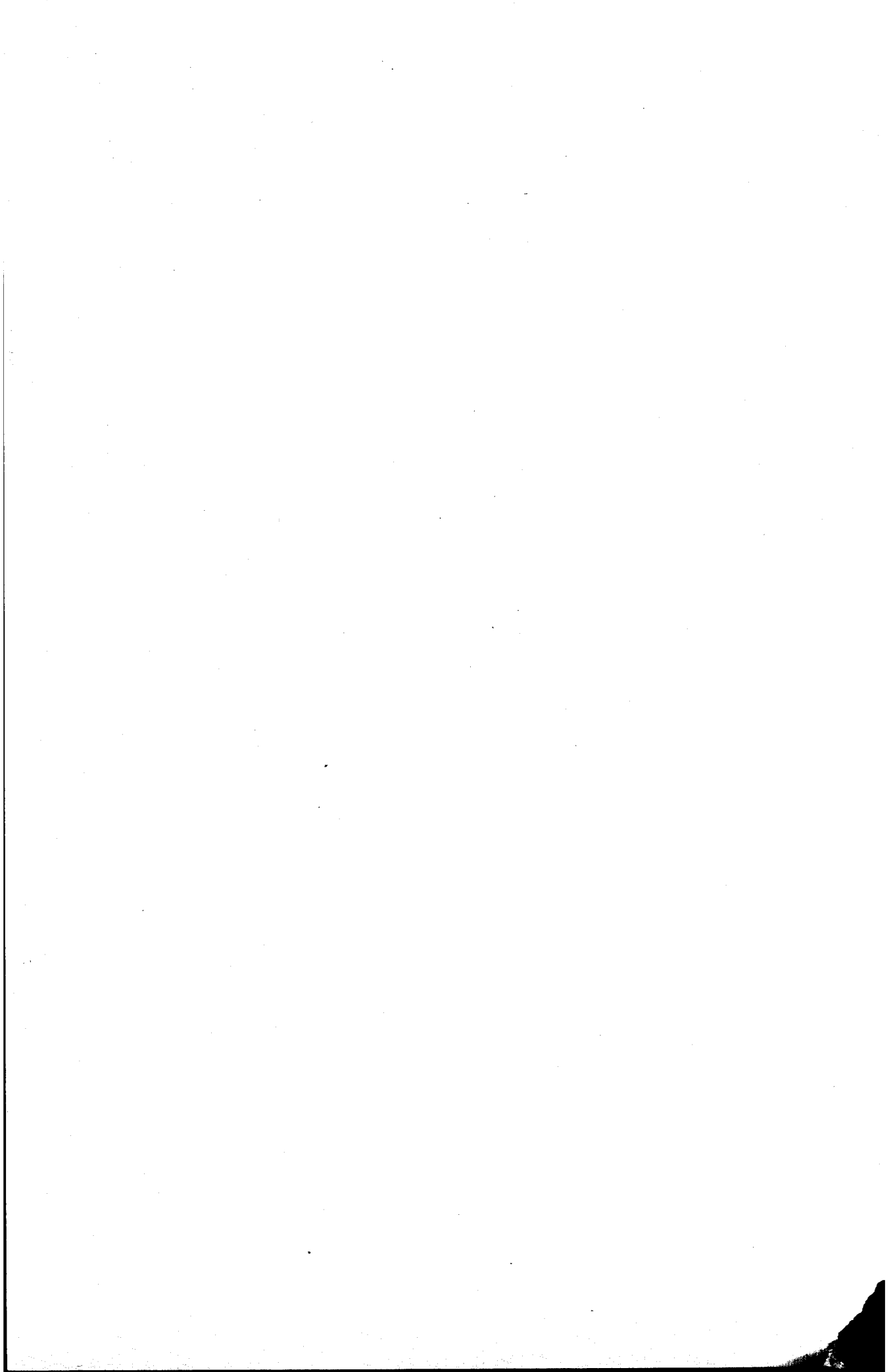

What is claimed is:

1. A dough working apparatus, comprising a bowl, means for bodily moving a dough mass in an orbit around the bowl in contact with the walls thereof, means for imparting a succession of rolling compressive actions upon the dough between the intermittent movements thereof, and means to prevent ribboning of the dough around the means for compressing the dough.

2. A dough working apparatus, comprising a bowl, means for bodily moving a dough mass in an orbit around the bowl in contact with the walls thereof, means for imparting a succession of rolling compressive actions upon the dough between the intermittent movements thereof, and means to prevent portions of the dough from collecting at the axis of the path of bodily movement of the dough.

3. A dough working apparatus, comprising a bowl, a pair of spaced rotatable cross-heads mounted within the bowl, a dough working roller rotatably mounted between the cross-heads at one side of the axis thereof and spaced cross-bars extending between the other ends of the cross-heads and disposed to work upon and feed a mass of dough around the bowl in contact with the walls thereof, one of said cross-bars having crank terminals rotatably mounted upon the cross-heads.

4. A dough working apparatus, comprising a bowl, spaced cross-heads rotatably mounted in the bowl, a dough working roller rotatably mounted between the cross-heads at one side of axis of rotation thereof, and a pair of cross-bars extending between the other ends of the cross-heads, the opposite half-sections of one of the cross-bars being inclined in opposite directions, and the other cross-bar having crank terminals pivotally mounted upon the cross-heads.

5. In a dough working apparatus, the combination of a bowl, a pair of rotatable cross-heads mounted therein on a horizontal axis, a dough working roller rotatably mounted between corresponding ends of the cross-heads, and cross-bars connecting the other ends of the cross-heads, one of said cross-bars having crank terminals pivotally mounted upon the cross-heads, the lower front wall of the bowl having an outwardly bulged portion defining a dough collecting space.

6. A dough working apparatus, comprising a bowl, means for intermittently moving a dough mass in an orbit around the bowl in contact with the walls thereof, and other means for imparting a succession of rolling compressive actions upon the dough mass between the intermittent movements thereof, the lower upright portion of one of the walls of the bowl being provided with an outwardly bulged portion forming a dough collecting space.

HERBERT H. HACKSTEDDE.

March 29, 1932.  L. HAMMOND  1,851,389
TABLE
Filed Aug. 13, 1929   3 Sheets-Sheet 1

Inventor
Laurence Hammond
By Lacey & Lacey, Attorneys